Nov. 11, 1941.   A. L. JOHNSON   2,262,005
HAND LEVER
Filed June 19, 1939
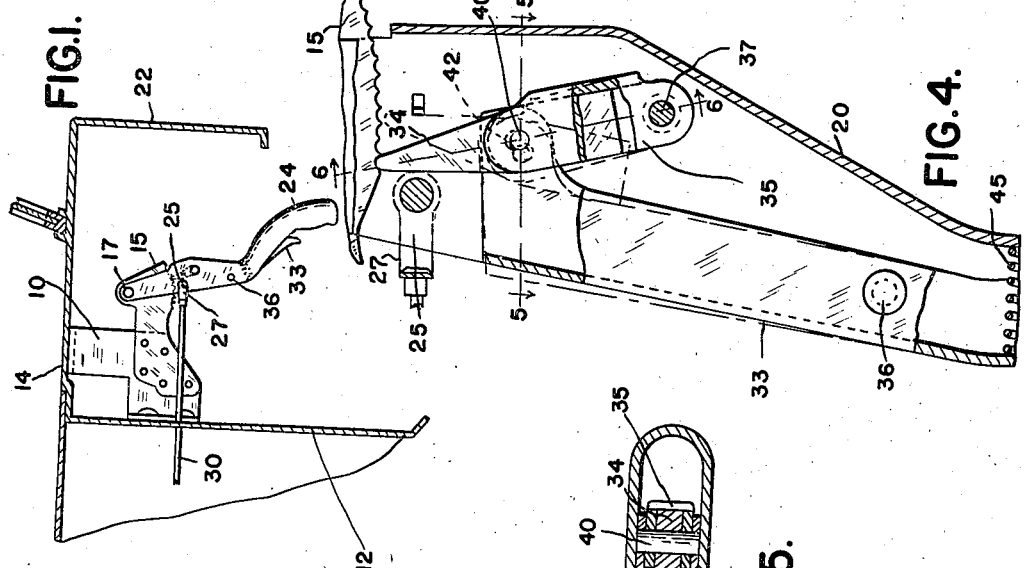
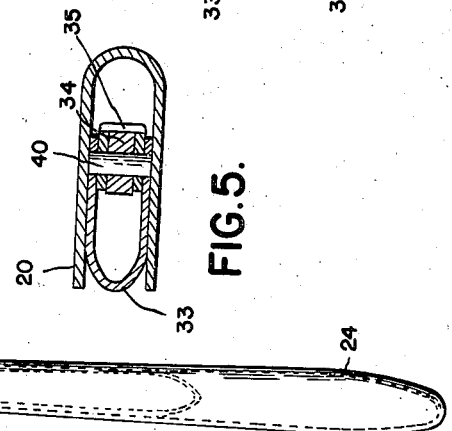
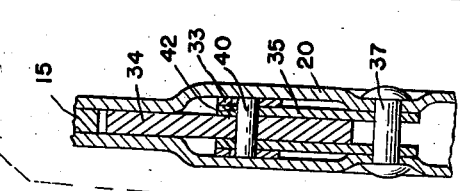
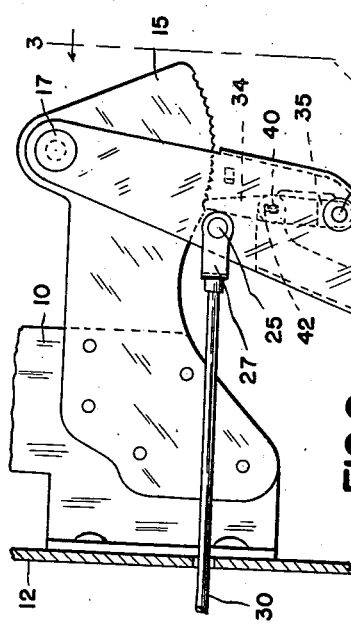
INVENTOR.
ALVIN L. JOHNSON
BY
ATTORNEYS Patented Nov. 11, 1941

2,262,005

UNITED STATES PATENT OFFICE 2,262,005

HAND LEVER

Alvin L. Johnson, Ottawa Hills, Ohio, assignor to American Forging and Socket Company, Pontiac, Mich., a corporation of Michigan Application June 19, 1939, Serial No. 279,857

6 Claims. (Cl. 74—537)

This invention relates to operating lever constructions, particularly for the hand control of remotely located mechanisms, as, for example, for controlling the emergency brake system of a motor vehicle.

An important object of the invention is to simplify the construction of hand levers of the character indicated, to permit the formation of virtually all the parts thereof from simple sheet metal stampings, and to provide, despite the simple and inexpensive nature of the mechanism, a device of great strength and rigidity, and which enables holding the brakes or other mechanism controlled thereby with great security, despite which the holding means is easily releasable under all conditions.

Another important object is to provide an improved pawl and ratchet mechanism of novel construction, which incorporates positive holding teeth for effectively locking the lever in any set position, yet which is very easily releasable under all conditions, the arrangement being such that in order to release the pawl it is not necessary to overcome the full sliding friction imposed upon the nose of the pawl by the load.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a somewhat diagrammatic and fragmentary vertical sectional view through the forward portion of the passenger compartment of a motor vehicle, provided with an operating lever constructed in accordance with the present invention and shown in side elevation.

Figure 2 is a side elevational view of the lever and its supporting bracket means on a somewhat larger scale, the adjacent portion of the dash panel being shown in section.

Figure 3 is an elevational view of the lever assembly taken substantially as indicated by the line and arrows 3—3 of Figure 2.

Figure 4 is a vertical sectional view, taken substantially on the line 4—4 of Figure 3, and looking in the direction of the arrows, certain parts of the mechanism being partially broken away; and Figures 5 and 6 are detailed sectional views taken substantially on the lines 5—5 and 6—6, respectively, of Figure 4, and looking in the direction of the arrows.

Referring now to the drawing, it will be seen that my improved lever is shown installed in a motor vehicle, for operating the hand brakes thereof, although it will be recognized that the indicated use is illustrative only. Its supporting means comprises a bracket 10 attached to the inner surfaces of the dash panel 12 and cowl 14, behind the instrument panel 22. A ratchet plate 15 is riveted or otherwise secured to the bracket, and the lever 20 is pivoted, as at 17, to the ratchet plate, and projects below the instrument panel 22 in position to be conveniently accessible to the operator of the vehicle. A hand grip portion 24 is formed at the lower end of the lever, while a cross pin 25 near the fulcrum serves to attach, by means of the clevis 27, the operating cable 30 for the brakes. The portion of the lever above the handgrip portion is U-shape in cross section, and housed therein are a trigger 33 and a pawl assembly formed in two pivoted sections, designated 34 and 35.

The trigger is pivoted upon a cross pin 36, and its lower extremity projects near the handgrip portion to enable convenient operation thereof, by the first finger of the operator.

The lower section 35 of the pawl is pivotally attached to the handle by a pin 37, while the upper and lower pawl sections are pivoted together by a cross pin 40. The pin 40 is also connected to the trigger, the upper end of which is provided with a slot 42, embracing the pin. The lower section 35 of the pawl assembly is of channel section, and the lower end of the upper pawl section 34 projects into the same. The two pawl sections will thus be seen to be rockable in one direction to angular relation although their movement in the opposite direction is limited to stop them in substantially rectilinear relation. When so straightened they act in compression and as a unit to block return movement of the lever. It will be seen that when the parts are in this blocking position, in which they are shown in full lines in Figure 4, the rounded end of the upper pawl section 34 engages in the complementarily formed notches in the plate 15, to prevent return movement of the lever. When the trigger 33 is pressed the pawl assembly is broken at the central pivot 40, the parts 34—35 assuming the angular relation shown in dotted lines in Figure 4, freeing the nose of the pawl section 34 from the ratchet to allow the return movement of the lever. The spring 45 which returns the trigger also returns the pawl sections to their straight relation when the trigger is released. When the brake handle is pulled back (to the right as viewed in Figs. 1, 2 and 4) to apply the brakes, the pawl assembly remains straight and rocks as a unit about pin 37, riding over the ratchet teeth in the usual manner. The same spring, 45, maintains the pawl assembly in engagement with the ratchet.

The pin 25 to which the brake-operating cable 30, or other element for control of desired mechanism, is attached, may also serve as an abutment for the upper pawl member, causing the same to break properly when the trigger is pressed. If desired, the parts may be so proportioned that the pin 40 passes slightly over center as the pawl sections assume their blocking or holding position. With such arrangement, any effort to return the handle, such as that exerted by the brake return springs (unshown), maintains the pawl sections more tightly in the locked position, and tends to resist their breaking, until positive effort is exerted on the central pivot through the agency of the trigger.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a blocking portion and a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, said spring also urging said pawl assembly bodily about the pivotal mounting of the support section in a direction to maintain engagement of the nose section with the ratchet.

2. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, said member comprising a hand lever pivoted concentrically with said ratchet, the nose section being in blocking engagement with said ratchet when said pawl sections are in said substantially rectilinear relation, stop means preventing angular movement of said sections materially beyond said rectilinear relation in the direction by which they are urged by said spring, said means for moving the hinge pivot comprising trip means carried by the lever and engageable with the pawl assembly between the ends thereof for moving said pawl sections angularly in the opposite direction to cause the nose section to move away from said blocking position.

3. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, the nose section being in blocking engagement with said ratchet when said pawl sections are in said substantially rectilinear relation, stop means preventing angular movement of said sections materially beyond said rectilinear relation in the direction in which they are urged by said spring, said means for moving the hinge pivot comprising trip means also carried by said rotatable member and engageable with the pawl assembly between the ends thereof for moving the hinge pivot in a direction to swing the pawl sections angularly in the opposite direction, to cause the nose section to move away from said blocking position, and additional blocking means preventing movement of the nose section in the same angular direction as the support section under the releasing influence of said trip means.

4. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, the nose section being in blocking engagement with said ratchet when said pawl sections are in said substantially rectilinear relation, stop means preventing angular movement of said sections materially beyond said rectilinear relation in the direction in which they are urged by said spring, said means for moving the hinge pivot comprising trip means having lost motion connection with said pawl assembly between the ends thereof for moving the hinge pivot in a direction to swing the pawl sections angularly in the opposite direction to that in which they are urged by said spring, to cause the nose section to move away from the ratchet, said pawl assembly being longer than the shortest distance between the ratchet and the pivot of the support section, whereby said pawl assembly acts in compression to block movement of the rotatable member with relation to the ratchet, said spring also acting on said trip means to maintain the same normally in one position.

5. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, the nose section being in blocking engagement with said ratchet when said pawl sections are in substantially rectilinear relation, stop means preventing angular movement of said sections materially beyond said rectilinear relation in the direction in which they are urged by said spring, said means for moving the hinge pivot comprising trip means including the lever pivoted on said rotatable member and connected to said pawl assembly between the ends thereof for moving the hinge pivot in a direction to swing the pawl section angularly in the opposite direction to that in which they are urged by said spring, to cause the nose section to move away from the ratchet, additional blocking means carried by the rotatable member for preventing movement of the nose section in the same angular direction as the support section under the releasing influence of the trip means, said stop means being carried by said pawl sections and permitting said sections to be moved slightly overcenter by said spring.

6. Pawl and ratchet mechanism comprising in combination with a toothed ratchet and a member rotatably mounted adjacent the same and whose movement is adapted to be controlled thereby, a pawl assembly carried by said rotatable member and comprising a nose section and a support section hinged together for angular movement substantially in the plane of the ratchet, the support section being pivotally mounted on said rotatable member, and the nose section being movable to and from operative engagement with said ratchet by swinging movement of said pawl sections with relation to each other, whereby the ideal distance between the free end of the nose section and the pivotal support of the support section is changed, means including a spring normally maintaining said sections in substantially rectilinear relation, whereby said nose section is maintained in blocking engagement with said ratchet, and means for moving the hinge pivot of said pawl assembly with relation to the ends thereof, to change the angular relation of said sections, stop means carried by said sections and preventing angular movement of said sections materially beyond a substantially rectilinear relation in one direction, said means for moving the hinge pivot comprising trip means for moving said sections in an opposite angular direction to cause the nose section to move away from the ratchet, said spring means also acting on said trip means, the nose section being in blocking engagement with the ratchet when said sections are in said substantially rectilinear position.

ALVIN L. JOHNSON.